I. MAISANO.
TOY.
APPLICATION FILED FEB. 26, 1920.

1,360,660. Patented Nov. 30, 1920.

Inventor
Ignatius Maisano,
By
Attorneys

UNITED STATES PATENT OFFICE.

IGNATIUS MAISANO, OF WILMINGTON, DELAWARE.

TOY.

1,360,660.  Specification of Letters Patent.  Patented Nov. 30, 1920.

Application filed February 26, 1920. Serial No. 361,573.

*To all whom it may concern:*

Be it known that I, IGNATIUS MAISANO, a citizen of the United States, residing at Wilmington, in the county of New Castle and State of Delaware, have invented new and useful Improvements in Toys, of which the following is a specification.

This invention relates to a toy for the amusement of children, it being designed to give entertaining rotary and rocking movements to an equestrian figure, ring bells periodically by the action of said figure and to operate a counter which registers and exposes to view the runs or circuits made by the latter. The invention also may include means whereby to produce a clicking sound to imitate hoof beats.

The invention consists in the construction and arrangement of parts hereinafter described, pointed out in the claims and illustrated in the accompanying drawing, in which—

Figure 1:
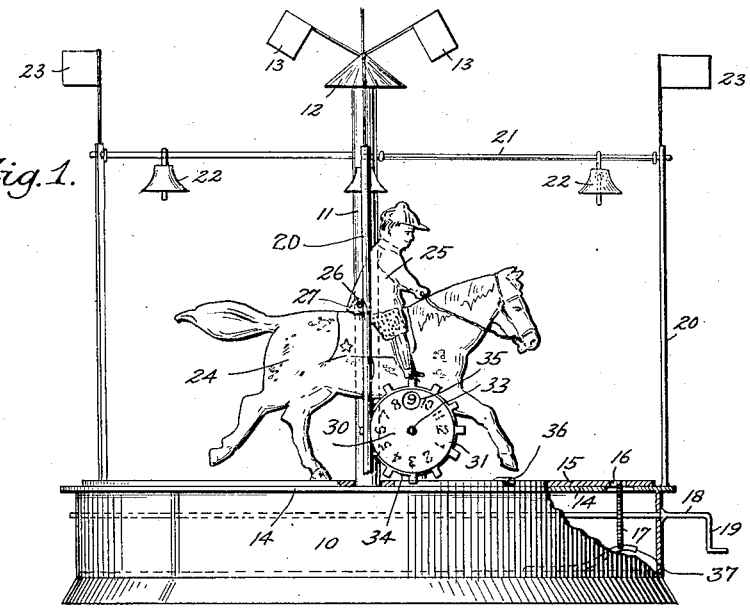
Figure 2:
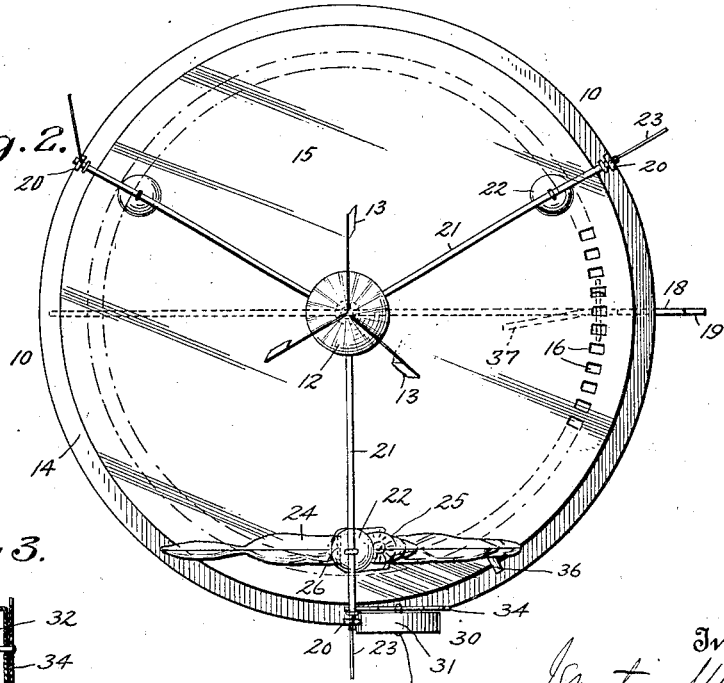
Figure 3:
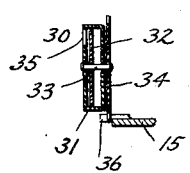

Figure 1 is an elevation of my improved device, and Fig. 2 is top view of the same. Fig. 3 is a sectional view of a detail hereinafter described.

10 indicates a circular box-like base from the center of which extends a post 11 rigid therewith and having an ornamental pinnacle 12 preferably decorated with flags 13. Pivotally mounted on the post 11, upon or slightly above the base 10 and parallel with its top 14, is a rotatable disk 15, near the edge of which and concentric therewith are stamped perforations 16 adapted to be engaged by the teeth of a spur wheel 17 passing through a hole in the top 14, said wheel being secured on a horizontal shaft 18 extending across the base 10 and journaled in opposite sides thereof.

One end of the shaft 18 projects beyond said base and is bent to form a crank 19 which when turned by the child rotates the disk 15 together with the equestrian figure, hereinafter more particularly described, fastened thereto.

To the top 14 of the base 10 are fixed at certain points around its edge, and outside of the disk 15, vertical rods 20 which reach nearly as high as the post 11, each rod being connected at its outer end with said post by a wire 21 preferably terminating in a staff carrying a flag 23. A bell 22 suspended from each wire 21, said bells having suitable hammers or clappers. The disk 15 near its edge rigidly supports the horse member 24 of the figure upon which is loosely mounted the rocking member 25 indicating a rider, the connection between said members being a pivot 26 passing through the back of the rider's coat and that of the horse or through a lug 27 projecting from the saddle. The position of the pivot 26 is such that the weight of the rider 25 is forward of the pivot, this overbalance causing him to seat normally in the position indicated in Fig. 1.

When the disk 15 is rotated by turning the crank 19 the horse and rider travel with it, and every time the rider passes a bell 22 the top of his cap will strike and ring it, as thus announcing progress around a race course. Each contact of the cap with a bell tilts the rider backward, he thus being self-righting on the pivot 26, and therefore after having passed that bell he resumes automatically his normal seat ready to be tilted again by contact with the next bell.

A spring rattle 37 may be placed within the base 10 so as to bear with pressure against the spur wheel 17, so that in the rotation of said wheel a clicking sound as that of hoof beats may be produced.

Increased interest is created by the use of a counter 30 fixed on one of the vertical rods 20 and adapted to register each full run of the equestrian figure 24, 25. This counter consists mainly of a circular box 31, see the section Fig. 3, having within it a number wheel 32 secured on a shaft 33, the latter passing through the axis of said box. Rearward of the number wheel is a toothed wheel 34 also fastened to the shaft 33, it being in position to encounter a pin or other projection 36 fixed to the rotatable disk 13. Therefore each revolution of said disk will give a part turn to the toothed wheel 34 and the number wheel 32, such movement being similar to that produced in a clock escapement. The respective numbers are exposed to view as indicated in Fig. 1.

Thus it will be seen that by the several coöperating actions provided for in my improved toy the incidents of a time and distance race run on a circular track are exemplified for the amusement and instruction of a child. The horse and rider are exhibited in full gallop—the latter in spirited action—bells are rung at the different stretches, the consecutive runs around the track are registered by visible number, and as stated, the sound of the horse's feet is or may be strikingly imitated. To heighten the effect of the latter one or more openings may be cut in the sides of the box-like base 10 whereby the noise produced by the rattler may be allowed free escape to the listening ear of the child.

My invention may be made chiefly if not entirely of metal, and many of its parts may be stamped out, the construction of the device therefore being of low cost and because of its material and construction, durable in character.

I claim:—

1. A toy comprising a circular base having a flat top, a vertical post rising from the center of said base and rigid therewith, a disk pivotally mounted on said post above its top and having a circular series of perforations near its periphery, a shaft extending through and journaled in said base and having a crank on one end, a gear wheel fixed to said shaft and engaging said openings whereby to rotate said disk, a figure representing a horse and rider secured to said disk to rotate therewith, the rider being pivoted to the horse, a plurality of vertical rods fixed to said base around the edge thereof, a wire connecting the top of each rod with said post, and a bell on each wire adapted to be struck by the rider when in rotation and passing a bell, said rider being tilted by the contact and by reason of the position of its pivot being self-righting.

2. A toy comprising a hollow circular base having a flat top, a vertical post rising from the center of said base and rigid therewith, a disk pivotally mounted on said post above said base top having a circular series of perforations near the periphery thereof, a horizontal shaft extending through said base and journaled in its opposite sides, a crank on the outer end of said shafts, a gear fixed to said shaft within the base and engaging said perforations for rotating the disk, a figure of a horse fixed at the edge of said disk, a self-righting figure in the form of a rider pivotally mounted on the horse, a plurality of vertical rods fixed to said base around the edge thereof, a wire connecting each rod with said vertical post, and a bell on each wire adapted to be struck by the rider when passing said bell, such contact tilting the rider backward, and means for effecting by overbalance of said rider his automatic return to a normal seat.

3. In a toy, the combination of an equestrian figure consisting of two members, that is to say a horse and a rider, the latter having tilting movement on the horse and being self-righting as described, a disk upon which said equestrian figure is rotatably mounted, means for giving rotation to said disk, a set of bells adapted to be rung by contact with the rider while in rotation, and a counter adapted to expose numbers to view and to be operated by the rotation of said disk.

4. In a toy, the combination of an equestrian figure consisting of two members, that is to say a horse and a rider, the latter having tilting movement on the horse and being self-righting as described, a disk upon which said equestrian figure is rotatably mounted, means for giving rotation to said disk, a set of bells adapted to be rung by contact with the rider in rotation, a counter adapted to expose numbers to view and to be operated by the rotation of said disk, and a rattler also operated by the rotation of the latter.

In testimony whereof I affix my signature in presence of two witnesses.

IGNATIUS MAISANO.

Witnesses:
 AGOSTINO DASSORI,
 NICOLANTONIO MINUTELLO.